United States Patent [19]

Hueber

[11] 4,396,349

[45] Aug. 2, 1983

[54] TURBINE BLADE, MORE PARTICULARLY TURBINE NOZZLE VANE, FOR GAS TURBINE ENGINES

[75] Inventor: Alfred Hueber, Eichenau, Fed. Rep. of Germany

[73] Assignee: Motoren-Und Turbinen-Union Munchen GmbH, Munich, Fed. Rep. of Germany

[21] Appl. No.: 357,629

[22] Filed: Mar. 12, 1982

[30] Foreign Application Priority Data

Mar. 16, 1981 [DE] Fed. Rep. of Germany ....... 3110098

[51] Int. Cl.³ ............................................. F01D 11/02
[52] U.S. Cl. .................................... 415/115; 415/137; 416/96 A; 416/241 B
[58] Field of Search ............... 415/115, 137, 138, 200; 416/96 A, 241 B, 96 R

[56] References Cited

U.S. PATENT DOCUMENTS

| | | | |
|---|---|---|---|
| 2,401,826 | 6/1946 | Halford | 415/115 |
| 2,497,041 | 2/1950 | Bodger | 415/200 |
| 2,859,935 | 11/1958 | Roesch | 415/115 |
| 3,540,810 | 11/1970 | Kercher | 415/115 |

Primary Examiner—Harvey C. Hornsby
Assistant Examiner—John T. Kwon
Attorney, Agent, or Firm—Scully, Scott, Murphy & Presser

[57] ABSTRACT

A turbine blade, more particularly a turbine nozzle vane, for a gas turbine engine, consisting of a structural metallic core enveloped at a distance by a ceramic blade jacket. Through provision a primarily highly heat-resistant, ceramic metal compound structure of the blade, the blade jacket is compressively prestressed spanwise between the blade shrouds in the inoperative condition of the turbine and where said compressive prestressing of the blade jacket, produced during assembly and which exists in the inoperative condition, is at least maintained during the operation condition by selecting for the metallic core of the blade, a material of average coefficient of thermal expansion and for the metallic inner and outer shrouds of the blade, and for the inner and outer metallic, sleeve-like components producing the axial prestress, materials of higher coefficients of thermal expansion, and for the highly thermally stressed ceramic blade jacket, a material of average coefficient of thermal expansion.

11 Claims, 4 Drawing Figures

TURBINE BLADE, MORE PARTICULARLY TURBINE NOZZLE VANE, FOR GAS TURBINE ENGINES

BACKGROUND OF THE INVENTION

1. Field of the Invention

The present invention relates to a turbine blade and, more particularly, relates to a turbine nozzle vane for gas turbine engines, consisting of a supportive metallic core encased by a ceramic blade jacket with spacing therebetween, in which there is provided at least one spanwise-oriented cooling air duct. Inner and outer shrouds or shroud segments are provided, by means of which the turbine vane is suspended from inner and outer structural casing components for, on the one hand, centered positioning and, on the other hand, for limited radial as well as axial thermoelastic flexibility.

In order to attain an improved fuel economy, as well as an enhanced performance of the gas turbine engines, the gas temperatures of especially present-day aircraft gas turbine engines, and also of modern stationary gas turbine plants, are required to be as high as possible.

Through sophisticated cooling concepts which require advanced design and production engineering efforts, the gas turbine engine technology has reached a state in which facilitates operation at turbine entry temperatures which, in part, are already located above the melting point of the turbine blade materials. This is presently achieved only with the aid of highly alloyed and, thus, expensive materials; requiring highly complex production techniques, with an attendant correspondingly high risk as well as mostly through also a considerable demand for cooling air.

2. Discussion of the Prior Art

German Laid-open patent application No. 28 34 864 discloses a rotor blade for gas turbine engines, consisting of a supportive metallic core encased by a ceramic blade jacket with a spacing therebetween. The inventive concept in that instance lies essentially in that the thin-sectioned airfoil engages in a slot of a blade tip plate extending along the circumference of the blade, and in which the tip plate is supported in the turbine disk through at least one rod-shaped or wire-shaped blade core by means of, respectively, one widened tip and, respectively, one widened root of the core.

A disadvantage attendant to this construction, on the one hand, lies in that a relatively large amount of air is required herein in order to cool the blade. On the other hand, in this presently known case, thermal stresses are encountered which are generated by the ceramic blade jacket coming into direct or indirect contact with cooling air.

The foregoing prior art approach also fails to provide adequate protection to the structural metallic blade core from thermal radiation, and in which, besides other considerations, no accurately definable support function can be imparted to the herein employed rod-like or wire-shaped blade core.

Another consideration is that this prior art approach primarily relates to rotor blades and, consequently, is predicated upon other criteria than would be primarily associated with a blade designed to serve as a guide vane.

SUMMARY OF THE INVENTION

Accordingly, it is a primary object of the present invention to eliminate the disadvantages encountered in the prior art and to provide an improved turbine blade, particularly a turbine nozzle vane of the type described, which contemplates an optimally high turbine inlet temperature, and involving a relatively uncomplicated technical complexity.

The present invention sets forth the provision of an inventive turbine blade, particularly a turbine nozzle vane, which can be used at relatively high turbine inlet temperatures; however, which still requires only an extremely low amount of cooling air. The invention also enables the use of relatively inexpensive nickel-based or Fe-based materials, which can be achieved in that the metallic components are subjected to only relatively moderate temperature increases.

In a further aspect of the present invention the cascade flow through the turbine duct is not in any manner affected by cooling air exiting from the blade, which provides for an improved degree of turbine efficiency. In a still further aspect of the present invention there can be constructed a turbine blade, especially a turbine nozzle vane, which is characterized by an adequate resistance to hot gas corrosion and, accordingly, eliminates the need for additional corrosion protective layers. In a further aspect of the present invention there is provided a turbine blade, particularly a turbine nozzle vane, which has a relatively thin leading edge so as to afford aerodynamically advantageous conditions, and which also provide advantages with respect to impinging foreign matter (carbon).

The basic inventive concept is thus predicated on continuously placing the ceramic nozzle vane jacket under a compressive load using a closed thermoelastic system. In this matter, for the thermoelastic tensioning, the moderate thermal expansion of the ceramic nozzle vane jacket is compensated for by means of the structural elements (sleeve-like components is addition to outer and inner vane shrouds) with considerably higher termal expansion and the metallic vane core with an especially low thermal expansion.

Due to the heat shield of the present invention there is avoided any significant flow of heat from the ceramic vane jacket to the metallic vane core, so that the required cooling air quantity can be maintained relatively low, and the ceramic vane jacket is prevented from being directly contacted by cooling air, so that thermal stresses can be extensively avoided.

BRIEF DESCRIPTION OF THE DRAWINGS

Reference may now be had to the following detailed description of the invention, taken in conjunction with the accompanying drawings; in which.

DETAILED DESCRIPTION

Figure 1:
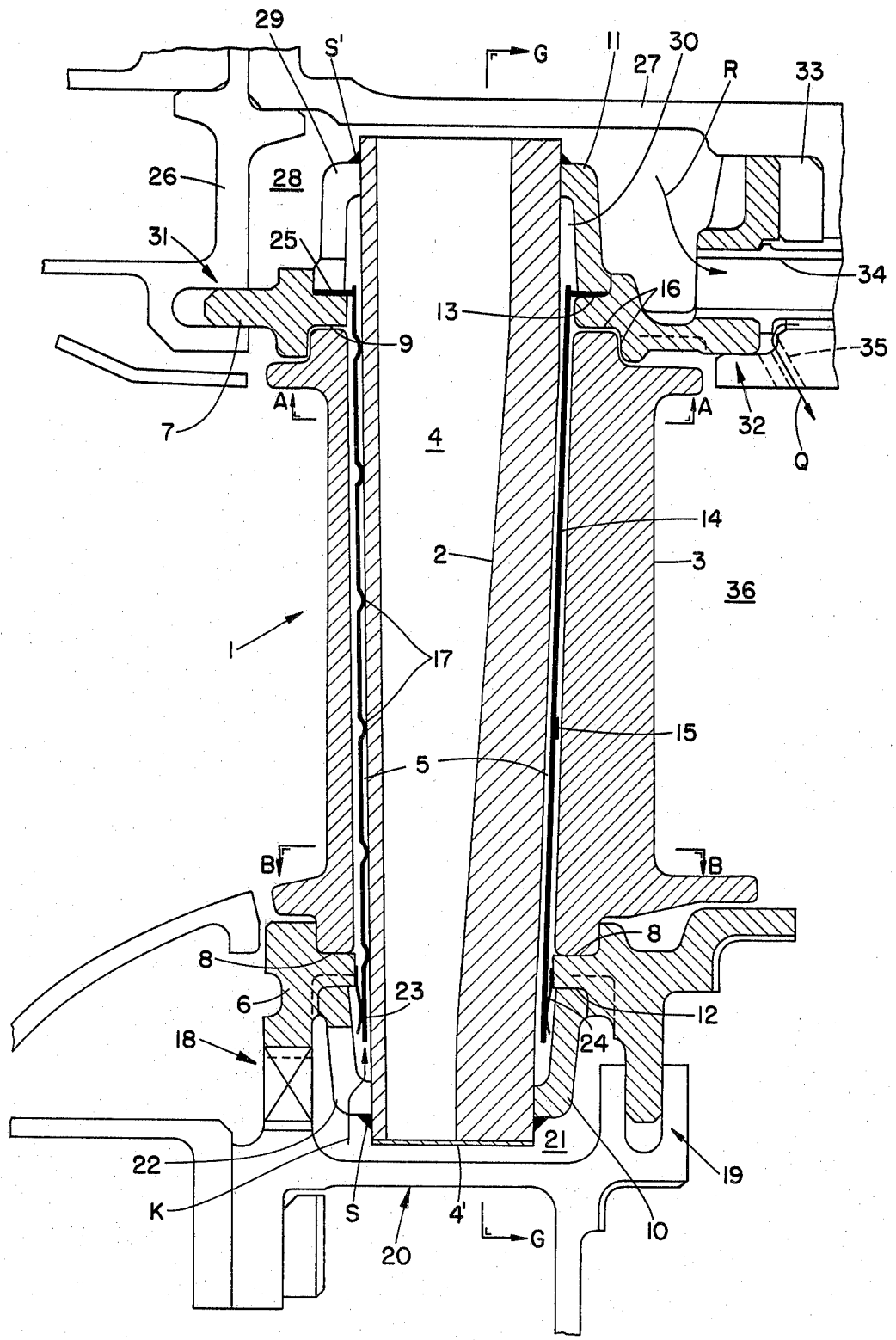
FIG. 1 is a sectional view illustrating a turbine section and a nozzle vane arranged in accordance with the present invention.
Figure 2:
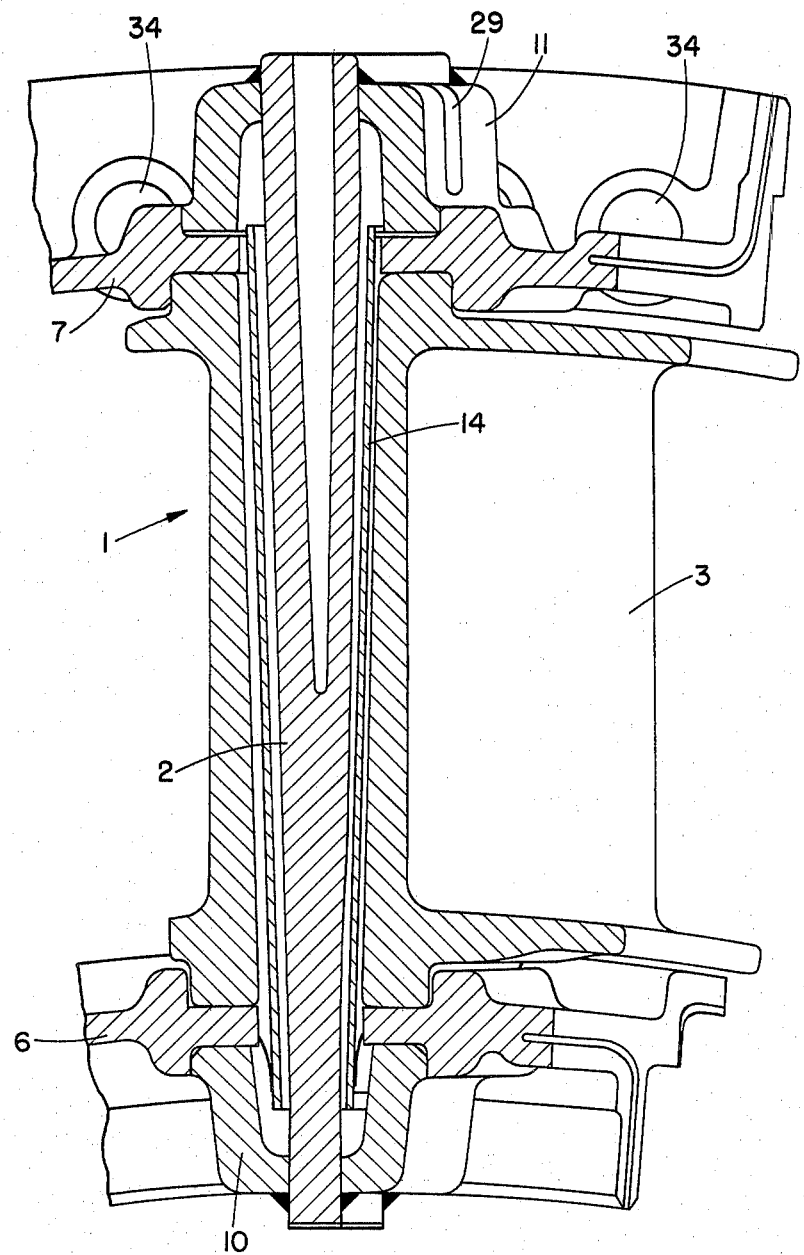
FIG. 2 is a sectional view taken along line G—G in FIG. 1.

With reference to FIGS. 1 and 2, the turbine nozzle vane 1 consists of a supportive metallic core 2 encased by a vane jacket 3 with a spacing therebetween. To economize on weight, the metallic core 2 is provided with a cavity 4 which, at its lower end is sealed with a cover plate 4' soldered thereto. The reference numeral 5 designates a cooling air duct. The reference numerals 6 and 7 designate inner and outer shrouds by means of which the turbine nozzle vane is suspended, in a manner still to be described more fully hereinbelow, from inner and outer structural casing components for, on the one hand, centerable location, and on the other hand, for limited radial and axial thermoelastic flexibility.

The vane jacket 3 engages in recesses 8,9 in the inner and outer shrouds 6, 7, and is preferably located between the two vane shrouds 6, 7 under prestressing which acts in the longitudinal direction of the vane, and which has preferably been determined before the turbine is placed into operation. First and second sleeve-like components 10, 11 are placed under concurrently acting forces to produce the prestressing and are welded to the metallic vane core 2 during assembly (referring to welds S,S'), in which each of the two sleeve-like components engages, with the end pointing away from the weld S or S' and facing towards the vane core 3, in a corresponding recess 12 or 13 of the inner or outer vane shroud 6 or 7.

As also becomes readily apparent from FIGS. 1 and 2, a heat shield is arranged between the vane core 2 and the vane jacket 3. This heat shield 14 extends in the longitudinal direction of the vane and encloses, between itself and the vane core 2, the vane cooling duct 5 to keep the cooling air from coming into contact with the ceramic vane jacket 3; and wherein the heat shield 14 serves the function of protecting the vane core 2 from thermal radiation from the vane jacket 3. With this configuration of the vane, the prestressing of the vane jacket 3, which has been produced already during assembly and which is also maintained in the inoperative condition, can be maintained or even enhanced during the operating condition. For this purpose, a material having a moderate thermal coefficient of expansion has been selected for the metallic core 2, and a material of high thermal coefficient of expansion for the metallic inner and outer vane shrouds, and particularly for the inner and outer metallic sleeve-like components 10, 11. For the operationally thermally high stressed vane jacket 3 a material of a typically average coefficient of thermal expansion has been selected.

In order to improve the thermal insulation of the vane core 2, the heat shield 14 is provided on the side thereof facing the vane jacket 3, with a thermal insulation layer 15 formed, for example, of $ZrO_2$. With reference to FIG. 1, the contact surfaces for the ceramic vane jacket 3 formed by the recesses 8 or 9 of the inner or outer shrouds 6, 7 are provided with a ductile, thermally insulating shim or a suitable coating. In a further aspect of the present invention, this shim may be in the form of a sheet.

Figure 3:
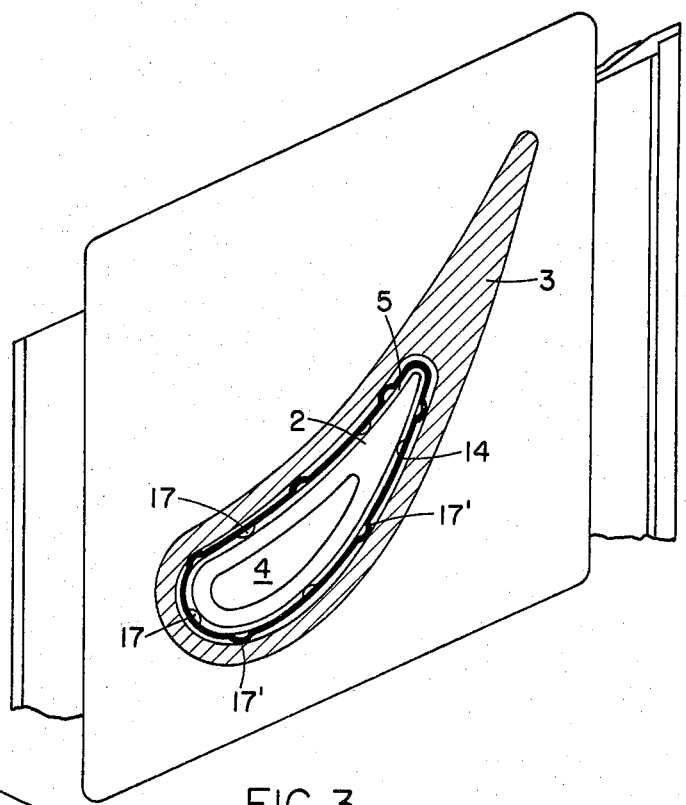
FIG. 3 is a sectional view taken along line A—A in FIG. 1.
Figure 4:
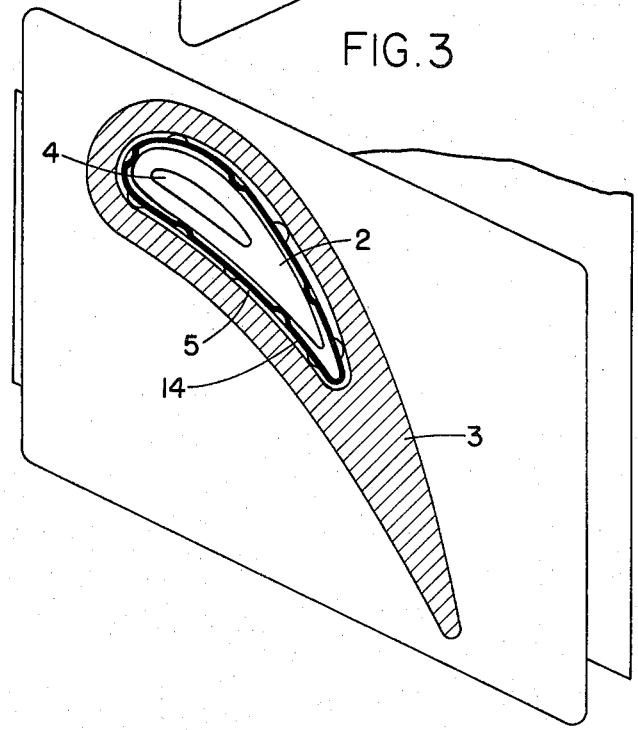
FIG. 4 is a sectional view taken along line B—B in FIG. 1.

As will also become apparent from FIG. 3, the heat shield 14 is provided with button-shaped protuberances 17 or 17' which abut against the vane core 2 or against the vane jacket 3.

Having reference to FIG. 1, the inner shroud 6 is arranged on an inner nozzle vane carrier 20 by means, on the one hand, of a centering connection 18 of a serrated or other similar shape and, on the other hand, by means of a tongue-and-groove connection 19. The tongue-and-groove connection serves to allow for a limited amount of radial play between the nozzle vane carrier 20 and the nozzle vane 1, or through the inner shroud 6.

As it will also become apparent from FIG. 1, the vane core 2 extends into proximity to the annular circumferential wall of the vane carrier 20. The nozzle vane carrier 20, together with the inner sleeve-like component 10 and wall portions of the inner vane shroud 6, encloses an annulus 21 which is supplied with cooling air (arrow K). This annulus 21 communicates, through slots 22 of the inner sleeve-like component 10, with a duct 23 formed between the component 10 and the vane core 2. The lower end of the heat shield 14 projects into the duct 23 so that the duct 23 directly communicates with the vane cooling duct 5, in which a preferably sheet-like metallic seal 24 is provided so as to bridge the gap between the heat shield 14 and the adjacent inner vane shroud 6.

In a further aspect of the present invention, the heat shield 14 is secured to a retaining plate 25 (top) in the recess 9 between the outer vane shroud 7 and the adjacent end of the outer sleeve-like component 11.

The metallic vane core 2, including the outer sleeve-like component 11 is arranged, above the ceramic vane jacket 3, within an annulus which is formed by stuctural casing components 26, 27 and by portions of the upper vane shroud 7. The annulus 28 communicates, through cooling air slots 29 in the outer wall of the outer sleeve-like component 11, with a duct 30 formed between the component 11 and the vane core 2. This duct 30, in turn, communicates with the vane cooling duct 5 formed between the vane core 2 and the heat shield 14. The cooling air required for this purpose can be bled from the compressor exit end (high-pressure compressor end in the case of multiple-spool turbojet engines) of the gas turbine engine.

As it will also become apparent from FIG. 1, the outer vane shroud 7 is suspended from the respective adjacent outer structural components of the casing 26, 33 by means of axially extending tongue-and-groove connections 31, 32 in which one of the connections 31 is made axially flexible so as to permit a limited amount of axial play.

The air contained in the outer annulus 28 is then ducted in the direction defined by arrow R, and through several, circumferentially equally spaced, cylindrical cooling air ducts 34 of the outer vane shroud 7 and the casing component 33, to an outer turbine section in the region of the outer rotor blade tips for conventional impingement cooling purposes, the illustration of which is omitted in the drawing. After it has picked up a certain amount of heat in its cooling function of the turbine casing, the cooling air is then directed in the direction defined by the arrow Q and through radial holes 35 into the casing component 33, to the operating cycle, or to turbine duct 36.

The inventive concept incorporates gas turbine engine applications generally; in essence, the invention can be applied to stationary gas turbine plants and also to turbojet engines.

What is claimed is:

1. In a turbine blade, particularly a turbine nozzle vane, for gas turbine engines, including a structurally supportive metallic core, a ceramic blade jacket encasing said core so as to form a space therebetween, at least one spanwise-oriented cooling air duct in said space, and where inner and outer blade shroud means for suspending the turbine vane from structural inner and outer casing components for centered positioning and for limited radial and axial thermoelastic flexibility; the improvement comprising:

(a) said blade jacket being inserted into recesses in the inner and outer blade shroud means and being subjected to compressive prestressing in the spanwise direction between the shroud means;

(b) first and second sleeve-like components being acted upon by concurrent forces to produce said compressive stress and being welded to the metallic core, each said component engaging, with its end pointing away from the weld and facing the core, in a corresponding recess in, respectively, the inner and outer shroud means;

(c) a spanwise oriented heat shield being arranged in the space between the blade core and the jacket; a cooling air duct being enclosed between the shield and the blade core;

(d) said structural arrangement of the blade maintaining the compressive prestressing of the blade jacket produced during assembly in the operating condition, said metallic blade core being a material having a moderate coefficient of thermal expansion is selected, said metallic inner and outer shroud means and the inner and outer metallic sleeve-like components being formed of materials having a higher coefficient of thermal expansion; and the highly thermally stressed or thermally resistant ceramic blade jacket being formed of a material of average coeffecient of thermal expansion.

2. Turbine blade as claimed in claim 1, wherein the heat shield includes a thermally insulating layer on the side facing towards the blade jacket.

3. Turbine blade as claimed in claim 2, said insulating layer comprising $ZrO_2$.

4. Turbine blade as claimed in claim 1 or 2, wherein the contacting surfaces formed by the recesses of the inner and outer shrouds for the ceramic blade jacket are provided with ductile, thermally insulating shim means.

5. Turbine blade as claimed in claim 4, wherein the shim has a sheet form.

6. Turbine blade as claimed in claim 1, wherein the heat shield includes button-like protuberances at least partially abutting the blade core or the blade jacket.

7. Turbine blade as claimed in claim 1, wherein the inner shroud is positioned on an inner nozzle vane carrier through a centering connection on one side thereof and a tongue-and-groove type, radially flexible connection on the other side thereof.

8. Turbine blade as claimed in claim 1, wherein the blade core (2) extends into proximity with the annular circumferential wall of the vane carrier so as to define, in conjunction with the inner sleeve-like component and wall portions of the inner blade shroud means, an annulus supplied with cooling air, said annulus communicating with a duct formed between the sleeve-like component and the blade core, the lower end of the heat shield projecting into said duct so that said duct directly communicates with the blade cooling duct between the core and the heat shield, and a sheet-like metallic seal being provided so as to bridge the space between the heat shield and the inner blade shroud.

9. Turbine blade as claimed in claim 1, wherein the heat shield is attached to a retaining plate in the recess between the outer shroud means and the end of the outer sleeve-like component abutting thereagainst.

10. Turbine blade as claimed in claim 1, said metallic blade core including the outer sleeve-like component being arranged above the ceramic blade jacket in an annulus defined by the casing components and by portions of the outer shroud means, said annulus communicating through apertures in the outer wall of the outer sleeve-like component with a duct formed between the sleeve-like component and the blade core, said duct communicating with the blade cooling duct formed between the core and the heat shield.

11. Turbine blade as claimed in claim 1, wherein the outer shroud means is suspended from outer casing components through axially extending tongue-and-groove connections, one said connection being axially flexible.

* * * * *